Jan. 7, 1930.  G. L. BENNETT  1,742,194
METHOD OR ART OF AND APPARATUS FOR MAKING ICE
Filed April 15, 1925
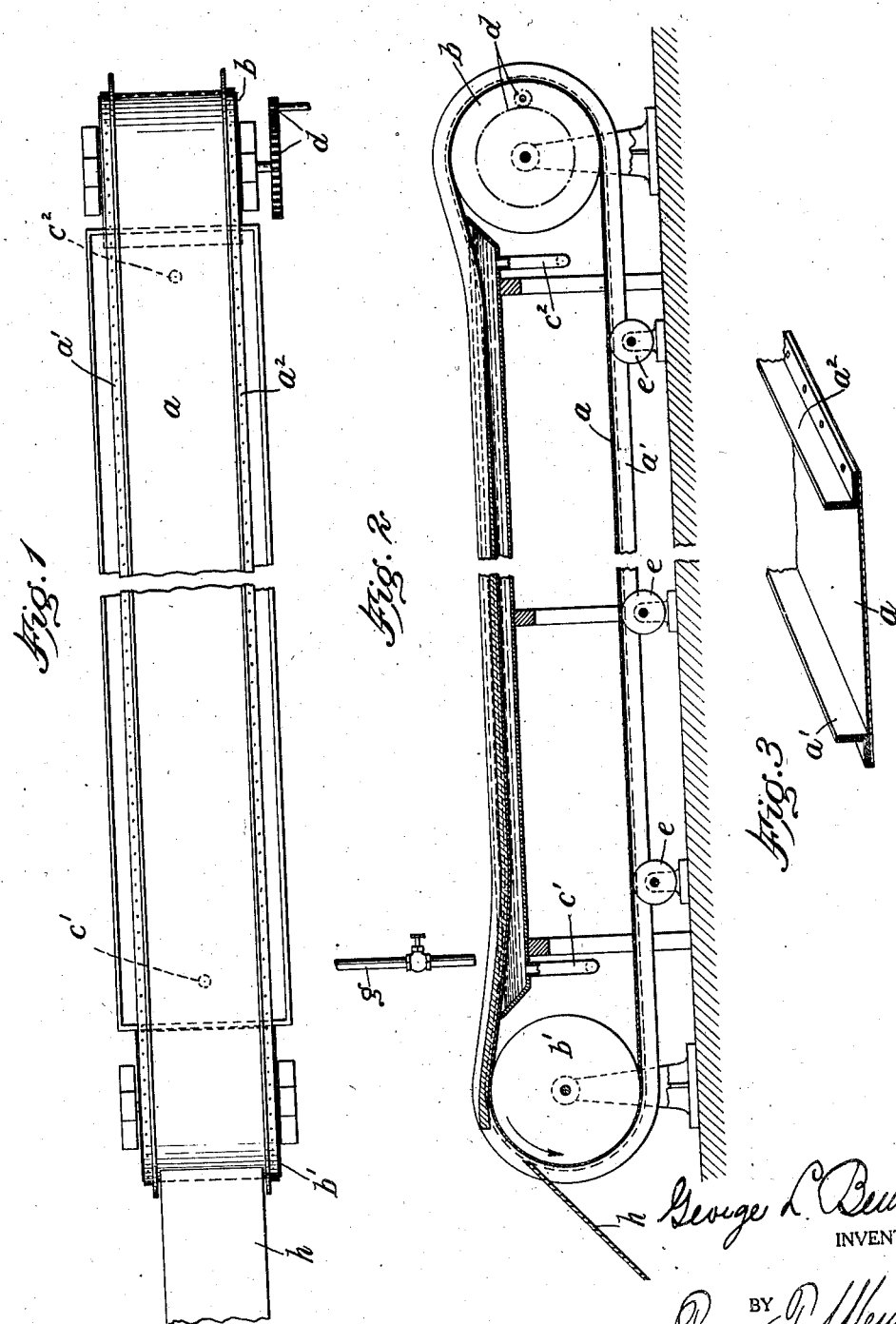
George L. Bennett
INVENTOR
BY Frank P. Wentworth
his ATTORNEY.

Patented Jan. 7, 1930

1,742,194

UNITED STATES PATENT OFFICE

GEORGE L. BENNETT, OF CLEVELAND, OHIO

METHOD OR ART OF AND APPARATUS FOR MAKING ICE

Application filed April 15, 1925. Serial No. 23,237.

My invention relates to the production of ice by a continuous method, and in sheet form of a thickness suitable for use as broken ice, as distinguished from cake ice, and consists more particularly of certain improvements in the invention described in United States Letters Patent No. 1,528,043, granted to me under date of March 3rd, 1925.

In the practice of the method of my aforesaid Letters Patent, and with the particular construction of apparatus therein shown, the accumulation of ice upon the traveling belt resulted in varying temperature conditions affecting the supply of water at different portions of the belt; and the volume of water delivered to the belt to secure the desired results had to be proportioned to the heat exchange conditions adjacent the point of delivery of this water.

By my present invention I am enabled to avoid the difficulties above referred to, and avoid a possible condition of stratification in the product due to an imperfect freezing action resulting from the delivery of water in succeeding stages upon a moving belt, and secure ice of the maximum thickness with a given economical time interval of operation. Furthermore, I am enabled to secure a more effective application of the refrigerant, and to maintain a uniform condition thereof during the entire period of heat exchange, while at the same time subjecting the entire volume of water to be frozen to substantially the same temperature conditions, and maintain an adequate supply of water to be frozen at a temperature sufficiently low to ensure its being rapidly congealed.

The invention consists in the novel steps and practices of the art or method of making ice, hereinafter set forth and described, and in an apparatus for practicing said art or method, embodying therein the novel features of construction and combination of parts hereinafter set forth and described and more particularly pointed out in the claims hereto appended.

Referring to the drawings,

Fig. 1 is a plan view of an apparatus used in the practice of my method or art;

Fig. 2 is a longitudinal section thereof; and

Fig. 3 is a detail view of a portion of one side of one embodiment of the conveyor belt used in the apparatus.

Like letters refer to like parts throughout the several views.

In the practice of the method or art of my invention, I employ a heat conducting sheet such as an endless thin metal belt, the upper reach of which is troughed longitudinally thereof so that a volume of water to be frozen may be maintained thereon, this volume of water being of substantially uniform depth throughout the greater portion of the belt, the water supply being replenished as ice is harvested. The pool of water is subjected to a refrigerating medium such as a bath of brine of the desired low temperature, throughout the entire lower portion thereof, the water to be frozen being maintained at a desired constant depth at all times, the cooled brine and the water to be frozen being prevented from mixing one with the other.

The belt and the ice formed thereon is moved slowly with relation to the pool of water thereon, it being possible to have this movement either continuous or intermittent, so long as the desired time interval during which the belt and its contents are subjected to the refrigerant is sufficient to congeal the water to a thickness which will permit the effective exchange of heat from the water to the refrigerating medium.

The water upon the belt will be frozen along the entire length thereof subjected to the action of the refrigerant, the thickness of the sheet of ice thus formed progressively increasing until the portion of the belt bearing same approaches the point where it is about to leave the pool.

The water in the pool is maintained at a temperature approximating 32° F., the ice being formed at the bottom of this pool and upon the sheet supporting same. I have demonstrated that ice of the necessary thickness can be produced in about one hour to one hour and a half under ordinary conditions, and that by progressively withdrawing ice from the pool, and replacing it with fresh water at approximately 32° F. and timing the harvesting or withdrawal of the ice with regard to its thickness, hard, clear ice may be produced under very economical conditions. In fact by using a belt for forming a trough in which a pool of water may be brought and maintained in the proper relation to the refrigerant, and giving this belt slow continuous, or short intermittent movement, not only will there be a continuous formation of ice, but a substantially continuous delivery of the ice. A fresh supply of water in order to maintain the pool at a substantially constant level, must be delivered thereinto to replace water removed in the form of ice.

Owing to the thickness of the ice upon the belt as it approaches the delivery point, but while it is still subjected to the action of the refrigerant, there will be a short interval during which the refrigerant acts upon the completed sheet of ice while it has no water upon same which will serve to dry the ice just before its delivery.

Water in volume proportionate to that congealed and delivered within a given time interval, is flowed to within the pool to maintain a substantially constant level of this water throughout the troughed portion of the belt, preferably adjacent the point of discharge of the ice so as to cause the water to flow counter to the movement of the ice for substantially the entire length of the pool, thus not only serving to agitate the water in the pool, but also developing other conditions in the making of ice which will contribute toward better quality of the ice and a more rapid exchange of heat units during its formation. This water supply may be, and preferably is, brought to a temperature just above its freezing point before delivery to the pool.

The ice will have attained its maximum thickness within the time interval during which it is subjected to the action of the refrigerant, as it approaches its point of delivery, this time interval being variable and being determined by the desired economy in the production of ice. The ice will attain a certain thickness fairly rapidly, but thereafter owing to its well known heat insulation properties, the subsequent formation of ice beyond that thickness requires a proportionately very much greater length of time. In fact in the practice of the process, the time interval is governed largely by this condition, advantage being taken of the fact that ice will be formed fairly rapidly upon the point of the belt most remote from the point of delivery of the ice, and will progressively form less rapidly as it approaches this point of delivery.

During the practice of the method or art of my invention there is present a continuous sheet of ice at the bottom of a pool of water, the volume of which water is always in excess of that required to make a sheet of the desired thickness and yet furnish water to every point of the belt in sufficient volume to ensure the effective freezing action of the maximum quantity of water within a given time interval, thus permitting the effective utilization of the refrigerant.

In the apparatus illustrated, I have shown an embodiment of the invention in which an endless, highly heat-conductive belt $a$ passes about rollers $b$—$b$, positioned beyond and adjacent the ends of a tank $c$. The roller $b$ is driven at low speed from any desired source of power by the speed reducing gearing $d$, the direction of rotation of said roller being as indicated by the arrow, for the purpose of creating slack in the upper reach of the belt $a$ so as to cause it to sag towards the longitudinal center of this reach. Suitable idler rollers $e$ support the lower reach of the belt.

The belt $a$ is preferably made of flexible metal having a smooth upper surface to facilitate the stripping of the ice therefrom, the high heat conductivity of the material of this belt facilitating the rapid formation of ice. The open top tank $c$ is positioned between the rollers $b$—$b'$ and adjacent the upper periphery of said rollers, but slightly below same, this tank having an inlet pipe $c'$ through which the cooled brine is delivered to the tank, and an outlet pipe $c^2$ leading from adjacent the opposite end of the tank, so as to permit the continuous circulation of cooled brine throughout said tank.

The length of the belt $a$ is such as to cause the top reach thereof to sag between the rollers $b$—$b'$ sufficiently to cause it to be immersed for the greater portion of its length in brine contained in the tank $c$. The normal curvature of the belt and the resistance to displacement of the brine due to the sag will result in a condition where its maximum extent of submergence will be for a considerable distance upon opposite sides of a point midway between the rollers $b$—$b'$, there being a sharp incline from this point to the point of said rollers, so that water is caused to flow from the ice adjacent the discharge end of the belt as the belt leaves the tank.

Of course, with a sagging belt as described, this condition throughout the belt will be maintained notwithstanding that there is a constant removal of ice from adjacent the tank, and the substantially constant delivery of sufficient water upon the belt to replace the volume of water removed in the form of ice.

Not only to secure the highest efficiency, but to prevent air bubbles and other matter in the water being included in the ice being formed, it is highly desirable to cause the constant movement or agitation of the water of the pool, and also to cause it to flow in a direction counter to that of the movement of the belt. To meet this condition, I provide a supply pipe $g$ above the end of the tank $c$ adjacent the roller $b'$. The water delivered by this pipe, to secure the best results, should be cooled prior to its delivery upon the belt to a temperature just above the freezing point of water, which condition also tends to avoid any material heating action upon the formed ice upon the belt at the point of delivery of the water.

Since the weight of the belt throughout the upper reach thereof is sufficient to submerge it in the cooled brine in the tank $c$ it is necessary to provide the belt $a$ with side dams of a height to extend above the level of the brine at the point of greatest depression in the sag of the belt $a$, which side dams, indicated at $a'$ and $a^2$, respectively have the two-fold function of excluding the brine from on top of the belt and preventing the escape of the water to be frozen from the belt to within the tank. These dams are preferably made of flexible rubber to permit the passing of the belt about the rollers $b$—$b'$, but little stretch being required to secure this result. By reason of the presence of these dams the belt will be supported by the brine or float thereon.

Co-operating with the belt as it passes about the periphery of the roller $b'$ is a stripper or doffer plate $h$ which will serve to remove the sheet of ice from the belt in the event that the sudden sharp bending of this belt does not effect the separation of the ice therefrom. This plate or blade will also serve to convey the ice from the machine either in sheet form or in pieces, in the event that the separation of the ice from the belt causes breakage of the sheet of ice.

In making ice in accordance with the method or art of my invention, and with an apparatus as herein described, a circulation of brine is maintained through the tank $c$, and water to be frozen is delivered continuously upon the belt $a$ and between the side dams $a'$—$a^2$ thereon, through the water supply pipe $g$, in volume sufficient to maintain a substantially constant level of water upon the upper reach of said belt thus forming and maintaining a pool of water thereon of substantially constant depth at all points excepting towards the opposite ends thereof. With this condition, the absorption of heat units by the brine in the tank $c$ will progress most rapidly by reason of the absence of ice upon the belt, and the water delivered through the supply pipe $g$ must flow the entire length of the pool in a direction counter to the movement of the belt before reaching this point. At the other end of the pool, or toward the roller $b'$, where the ice will have attained its maximum thickness, the brine will have no appreciable freezing action upon the water, but there will be a short interval during which it will act upon the sheet of ice after it has left the pool of water to dry its upper surface.

The roller $b$ is turned slowly to move the belt through the brine tank, it being possible to use either a continuous movement or an intermittent movement while still having a continuous production of ice.

The time interval between the initial formation of ice and the delivery of the sheet may be varied, although to secure the highest economy in the practice of the method or art, and the operation of the apparatus, this interval should be determined by the well known fact that ice of a certain thickness will form rapidly, but thereafter, by reason of the presence of the ice between the water and the refrigerant, the freezing action will be slower. Hence by limiting the thickness of the sheet of ice formed upon the belt $a$, an increased output of ice may be secured within a given time interval, and the refrigerant may be more effectively utilized in the production of the ice, thus securing economy in the operation of a plant. By causing the belt to dip within the brine in the tank in the manner herein described, the water upon the belt will be subjected upon three sides of the refrigerant, but the area thus subjected to the refrigerant along the sides thereof is not sufficient to materially affect the production of ice upon the belt.

By using an open-topped tank through which the brine is circulated in the manner described, practically all friction upon the belt during the formation of ice, is avoided.

As heretofore stated, the ice is formed directly upon and against the belt, and at the bottom of the pool of water thereon, ensuring the effective congealing of the greatest volume of water within a given time interval and permitting the effective utilization of the refrigerant in securing the maximum thickness of ice, since there will always be a reserve of water beyond that required to produce ice of the desired thickness, and this water will always be maintained at a low temperature even though the heat units absorbed therefrom by the brine are insufficient to form ice from the entire volume of water. The negative heat of the brine will be utilized in part for the formation of the ice, and in part in maintaining the water of the pool upon the belt at a desired low temperature, where, with the movement of the belt as it displaces the formed ice toward the roller $b'$, it may be quickly congealed, and yet will be in substantially constant motion so as to effectively separate air bubbles, and other matter from the water being congealed.

It is not my intention to limit the construction of the dams $a'$—$a^2$ to that particularly shown in the drawings, this form being used because it affords a substantially water-tight joint, and avoids the development of any heat from friction, but these are merely matters of securing the highest economy, and other means for preventing the brine from flowing upon the belt, or the water upon the belt to within the brine tank, may be used.

Having described the invention, what I claim as new and desire to have protected by Letters Patent, is:—

1. A method or art of making ice consisting in forming a pool of water upon a troughed element, subjecting the lower portion of this pool of water to the action of a refrigerant, whereby ice will be formed throughout the bottom of said pool of water, gradually withdrawing said troughed element and the ice in sheet form thereon from said pool of water, and gradually flowing water into said pool to replace the water withdrawn in the form of ice, and to maintain said pool at a substantially constant level.

2. A method or art of making ice consisting in forming a pool of water upon a troughed element, subjecting the lower portion of this pool of water to the action of a refrigerant, whereby ice will be formed throughout the bottom of said pool of water, gradually withdrawing said troughed element and the ice in sheet form thereon from said pool of water, and gradually flowing water into said pool to replace the water withdrawn in the form of ice, to agitate the water in the pool and to maintain said pool at a substantially constant level.

3. A method or art of making ice consisting in forming a pool of water upon a troughed element, flowing a liquid refrigerant along said element adjacent the lower portion of the pool of water, whereby ice will be formed throughout the bottom of said pool of water, gradually withdrawing said troughed element and the ice in sheet form thereon from said pool of water by a movement counter to the direction of flow of said refrigerant, and gradually flowing water into said pool at the end thereof adjacent the point of withdrawal of the ice to replace the water withdrawn in the form of ice, to agitate the water in the pool, and to maintain said pool at a substantially constant level.

4. A method or art of making ice consisting in forming a pool of water upon a troughed element, flowing a liquid refrigerant along said element adjacent the lower portion of the pool of water, whereby ice will be formed throughout the bottom of said pool of water, gradually withdrawing said troughed element and the ice in sheet form thereon from said pool by a movement counter to the direction of flow of said refrigerant, gradually flowing water into said pool at the end thereof adjacent the point of withdrawal of the ice to replace the water withdrawn in the form of ice, and to maintain said pool at a substantially constant level, said pool of water being shallow at the end thereof adjacent that at which water is flowed thereinto, whereby water with the withdrawal of ice will flow from upon the ice, and towards the other end of said pool, whereby the ice being withdrawn will have its top surface dried, and substantially all portions of the water in the pool will be kept in motion in a direction counter to that of the movement of the ice.

5. An apparatus for making ice embodying therein an endless belt, means for imparting travel thereto, said belt being of a length and said means being so positioned as to cause the upper reach of the belt to sag longitudinally thereof, means whereby water will be confined in a pool in the sagged portion of said belt, means whereby the sagged portion of the belt is subjected to the action of a refrigerant, and means whereby water to be frozen may be delivered upon said sagged portion of the belt to replace the water removed in the form of ice from the pool upon the belt.

6. An apparatus for making ice embodying therein an endless belt, means for imparting travel thereto, said belt being of a length and said means being so positioned as to cause the upper reach of the belt to sag longitudinally thereof, means whereby water will be confined in a pool in the sagged portion of said belt, an open-topped tank into which the sagged portion of said belt extends, means for circulating cooled brine through said tank and in engagement with said sagged portion, and means whereby water to be frozen may be delivered upon said sagged portion of the belt to replace the water removed in the form of ice from the pool upon the belt.

7. An apparatus for making ice embodying therein an endless belt, means for imparting travel thereto, said belt being of a length and said means being so positioned as to cause the upper reach of the belt to sag longitudinally thereof, means whereby water will be confined in a pool in the sagged portion of said belt, an open-topped tank into which the sagged portion of said belt extends, a water supply pipe above said belt adjacent the point where it leaves said tank, a supply pipe through which cooled brine is delivered to said tank adjacent the same end thereof as said water supply pipe, and a brine offtake pipe adjacent the other end of said tank, whereby brine may be circulated through said tank in a direction opposite to the movement of the belt with relation thereto.

8. An apparatus for making ice embodying therein an endless belt, means for imparting travel thereto, said belt being of a length and said means being so positioned as to cause the upper reach of the belt to sag longitudinally thereof, dams extending along opposite sides of said endless belt whereby water will be confined in a pool in the sagged portion of said belt, an open-topped tank into which the sagged portion of said belt extends, means for circulating cooled brine through said tank and in engagement with said sagged portion, and means whereby water to be frozen may be delivered upon said sagged portion of the belt to replace the water removed in the form of ice from the pool upon the belt.

9. An apparatus for making ice embodying therein an endless belt, means for imparting travel thereto, said belt being of a length and said means being so positioned as to cause the upper reach of the belt to sag longitudinally thereof, dams extending along opposite sides of said endless belt whereby water will be confined in a pool in the sagged portion of said belt, an open-topped tank into which the sagged portion of said belt extends, a water supply pipe above said belt adjacent the point where it leaves said tank, a supply pipe through which cooled brine is delivered to said tank adjacent the same end thereof as said water supply pipe, and a brine offtake pipe adjacent the other end of said tank, whereby brine may be circulated through said tank in a direction opposite to the movement of the belt with relation thereto.

In witness whereof I have hereunto affixed my signature, this 6th day of April, 1925.

GEORGE L. BENNETT.